Jan. 8, 1963 W. F. STOERMER 3,072,323
CENTRIFUGAL FILTER AND FLUID SEPARATION DEVICE
Filed March 30, 1960 2 Sheets-Sheet 1

Inventor
William F. Stoermer by Hill, Sherman, Meroni, Gross & Simpson Attys.

Jan. 8, 1963  W. F. STOERMER  3,072,323
CENTRIFUGAL FILTER AND FLUID SEPARATION DEVICE
Filed March 30, 1960  2 Sheets-Sheet 2

Inventor
William F. Stoermer
by Hill, Sherman, Meroni, Gross & Simpson  Attys

United States Patent Office 3,072,323
Patented Jan. 8, 1963

3,072,323
CENTRIFUGAL FILTER AND FLUID
SEPARATION DEVICE
William F. Stoermer, Grafton, Ohio, assignor to Thompson Ramo Wooldridge Inc., Cleveland, Ohio, a corporation of Ohio
Filed Mar. 30, 1960, Ser. No. 18,608
4 Claims. (Cl. 233—33)

This invention relates to a means for filtering and separating impurities from fluid bodies and is more particularly directed to an improved means for centrifugal filtering and separating of undesired solid and fluid components of a fluid body.

It has been customary in the prior art to employ filtering and separating apparatus wherein centrifugal forces are utilized to effect separation of either solid or fluid components from a fluid body.

Difficulties had been encountered, however, in the design of such centrifugal filter apparatus in that the passages formed for removal of the solid impurities from the centrifuge chambers were frequently clogged or plugged thereby thus affecting operation of the apparatus. Furthermore, where solid impurities were to be separated from a mixture of fluids, the impurities would be carried into the impurity collecting zone by the less dense fluid which, of course, would contain a small percentage of the denser fluid, and, if it were subsequently desired to separate the denser fluid from this partially filtered mixture, it was found that this mixture contained a portion of the solid contaminants preventing fluid separation. Thus this portion of the denser fluid was unavailable for use.

Where the degree of clogging or plugging of the filter separation apertures leading to the solid contaminant collecting zone reached the point where it seriously interfered with operation of the centrifugal filter, it had been necessary to completely disassemble the filter apparatus in order to clean these apertures and the collecting zone. Since most of the centrifugal filters are driven by pump type, impeller means, such disassembly and reassembly would disturb the alignment of the drive mechanism and would thus disturb the original dynamic balance of the centrifugal filter thereby affecting subsequent operation.

By employment of my invention, I substantially overcome the problems and difficulties of the prior art, and provide simple and effective means for centrifuging solid impurities from fluids or mixtures of fluids and permit ready separation of the fluid components which carry the impurities to the collecting zone, as well as cleaning and reassembling of the centrifugal filter without disturbing the dynamic balance of the filter assembly.

It is, therefore, among the objects of the present invention to provide new and improved, centrifugal means for filtering and separating solid impurities from fluid bodies.

It is another object of the present invention to provide centrifugal means for filtering and separating both solid and liquid components from fluid bodies.

It is still another object of the present invention to provide, centrifugal means adapted for the removal of a less dense fluid substantially free of solid impurities from a mixture of fluids.

It is a further object of the present invention to provide centrifugal means having filter fluid outlets formed therein to permit maximum passage of fluid and minimum passage of solid impurities therethrough.

It is a still further object of the present invention to provide, centrifugal means having an integral filter chamber rotatably mounted thereon for the collection of solid impurities from a centrifuged fluid component of a mixture of fluids.

It is another object of this invention to provide a centrifuge filter assembly, simple and compact in construction and efficient in operation.

These and other objects, features and advantages of the present invention will become apparent upon a careful consideration of the following detailed description, when considered in conjunction with the accompanying drawing, illustrating a preferred embodiment of the concepts of my invention, wherein like reference characters and numerals refer to like or corresponding parts throughout the several views.

Briefly stated, my invention relates to filtering and separating means comprising a centrally located drive assembly having a stationary pintle through which extends a quill shaft coupled at one end to a drive shaft (not shown) and having the other end splined to a spider mounting a rotor, pump type centrifugal impeller carrying a collecting and separating chamber defined by apertured spaced-apart, cylindrical shell members.

Figure 1:
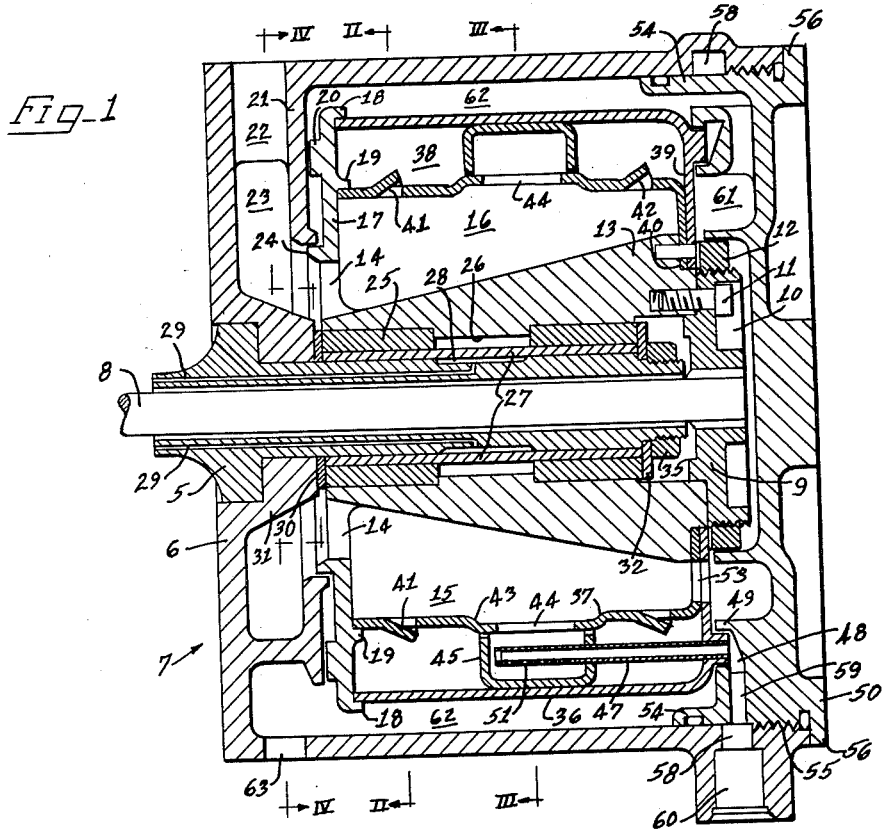
FIGURE 1 is a view in longitudinal section illustrating a preferred embodiment constructed in accordance with my invention.
Figure 4:
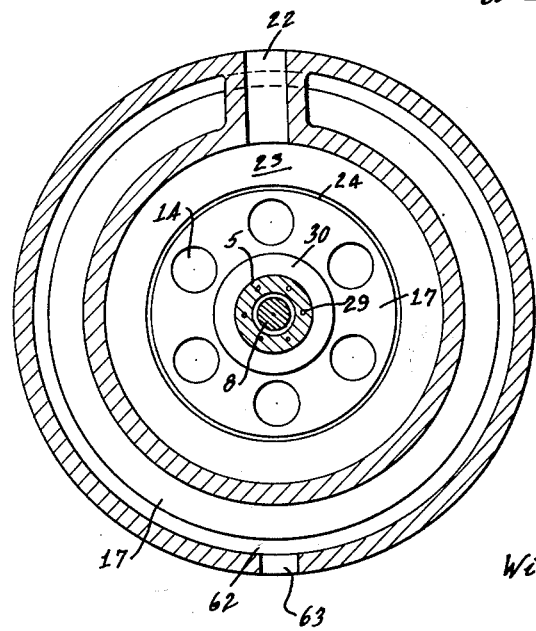
FIGURE 4 is a view in cross-section taken along lines IV—IV of FIGURE 1.

As appears in FIGURE 1, the central drive assembly comprises a stationary pintle 5 mounted on the end wall 6 of the filter housing 7. Extending axially through the pintle is a quill shaft 8 utilized to drive the impeller means which is coupled at one end to the shaft of drive means (not shown). The opposite end of the shaft 8 is splined into a substantially cylindrical spider member 9. Inwardly of its periphery, spider 9 is provided with an annular recess 10 to receive a plurality of spaced, impeller rotor securing means, such as bolt 11. The spider is exteriorly threaded to receive a nut 12 to positively seat the spider against the rotor 13 thereby assisting in establishing and maintaining the static and dynamic balances of the centrifuge impeller assembly.

The pump type, centrifugal impeller assembly includes the rotor 13 outwardly tapering from the unfiltered fluid source inlets 14 to its opposite end, and mounts a plurality of impeller vanes 15 for imparting centrifugal flow to fluid in the plurality of centrifuge chambers 16 defined by the vanes. The rotor 13 carries integral therewith a cylindrical bottom or end plate 17 provided with the plurality of inlets or apertures 14 positioned near the base of the rotor for introducing unfiltered fluid into the centrifuge chambers. The bottom plate 17 is provided with an inturned peripheral flange 18 and spaced inwardly therefrom is an internal annular ring 19. Bottom plate 17 is also provided with an annular spacer projection 20 positioned in proximity to the internal wall surface 21 of the housing 7.

End wall 6 of the housing 7 is provided with a fluid inlet passage 22 for introducing a contaminant-containing fluid medium into an annular passage 23 which communicates with the inlets 14 of the centrifuge chambers. The bottom plate 17 of the rotor assembly includes an outturned flange 24, preferably tapered as shown, to provide a surface presenting a minimum of interference with fluid flow into the inlets 14 from the annular passage 23.

The rotor 13 engages a coaxial stationary sleeve 25 constructed of a material permitting a minimum of frictional engagement between the rotor and the sleeve. As shown in FIGURE 1, the rotor is provided with a centrally located inwardly projecting portion 26 to assure positive engagement of the rotor and sleeve and to assist in maintaining the dynamic balance of the impeller assembly.

Positioned between the rotor sleeve 25 and the pintle 5 is a stationary dampening sleeve 27. The pintle has an annular recess 28 located centrally in the housing. A plurality of passages 29 formed in the pintle communicating with the recess 28 for introducing a fluid under high pressure thereto (which may be impurity-free fluid of the same type being filtered to minimize the effects of possible leakage into the centrifuge chambers) which acts on the dampening sleeve 27 to provide means for suspending the rotating members of the impeller assembly on a film or cushion of said fluid whereby any vibration effects (which may be produced, for example, by a slight unbalance caused by impurities collecting in pockets in the collecting zone) are decreased.

Seal means 30 shouldering on an inwardly projecting boss 31 of the housing end plate 6 assure positive sealing of the pintle, dampening sleeve and rotor sleeve. Similar seal means 32 are provided at the opposite end of the pintle to seal the pintle, dampening sleeve and rotor sleeve in a similar manner. A securing means, such as nut 35, may be provided for threaded engagement with the pintle 5 to assure positive seating of the seal means 30 and 32, to align sleeves 25 and 27 and to seat the pintle 5 in the end wall 6.

As aforementioned, an important feature of the present invention resides in the integral impurity collecting and fluid separating means which rotates with the centrifuge assembly. In the preferred embodiment, as appears in FIGURE 1, such means take the form of a pair of coaxial, spaced apart cylindrical shell members 36 and 37 which define therebetween the impurity collecting and fluid separating chamber 38.

The inner cylindrical shell member 37 seats at one end against a shoulder provided by the internal annular ring 19 of the rotor bottom plate 17 and has at its opposite end an inturned flange 39 seating against the shoulder provided by a recess 40 in the rotor 13.

Figure 2:
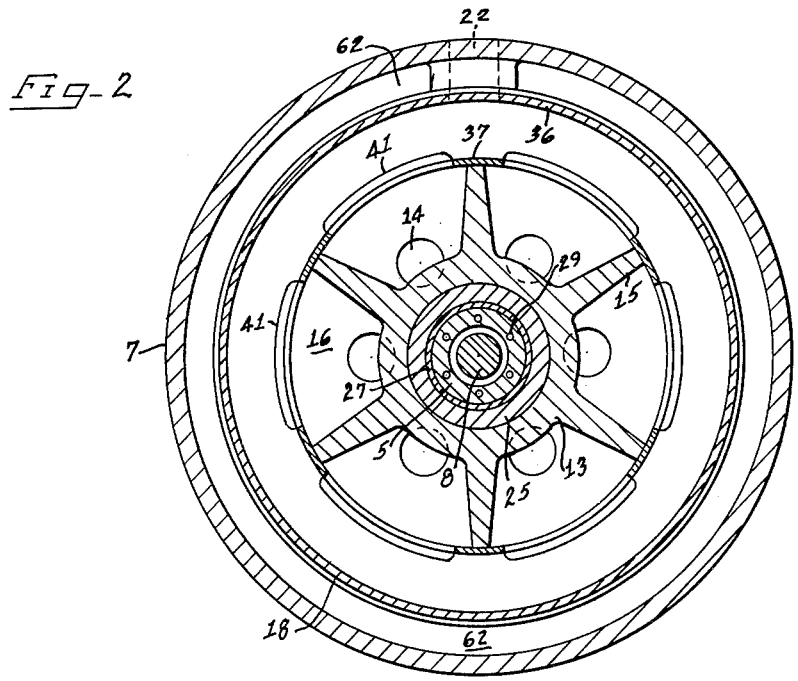
FIGURE 2 is a view in cross-section taken along lines II—II of FIGURE 1.

Inwardly of both ends, shell 37 is provided with a plurality of outwardly extending louvers 41 and 42 respectively (FIGURE 2). Louvers 41 are provided in the cylindrical wall for receiving the heavier and denser solid particles and for this purpose are positioned in proximity to the inlet end of the centrifuge chambers 16. Similarly, the louvers 42 are positioned at the other end of the centrifugal chambers for receiving lighter weight particles, such as lint.

The shell member 37 is provided with an annular and outwardly extending depression 43 having formed therein a plurality of longitudinally extending axial apertures 44 permitting communication between the centrifugal chambers and the collecting chamber 38.

It has been my experience that the majority of fluid separation generally occurs in the central area defined by the depression 43 and that, by providing axial slots 44 in the depression rather than louvers, maximum passage of the less dense fluid component is obtained with a minimum passage of solid impurities.

To further reduce the amount of solid particles which may be suspended or contained in the fluid mixture in the separating chamber, I provide an annular ring 45 positioned between the inner and outer shells for communication with the axial slots 44. The ring 45 may be constructed preferably in U-shaped form as shown, to substantially equalize the pressure conditions in the collecting chamber 38. The ring 45 may be secured to the outer shell in any well-known manner, such as by brazing, welding, etc.

Figure 3:
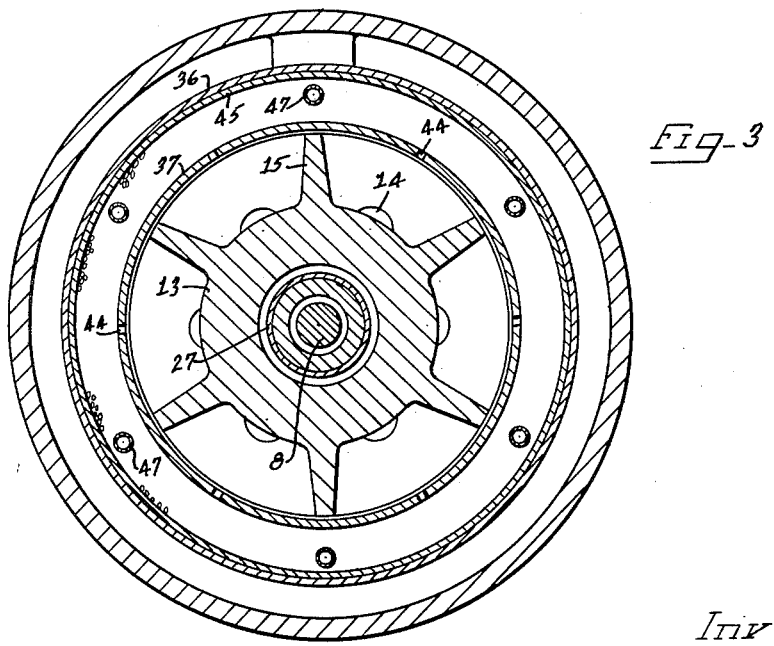
FIGURE 3 is a view in cross-section taken along lines III—III of FIGURE 1.

Thus, as the undesired lower density fluid passes from the plurality of centrifuging chambers through the axial slots 44 into the collecting zone defined by the collecting ring 45, the small amount of solid impurities contained therein which passed through the slots 44 will gradually settle out in a thin layer (FIGURE 3) against the outer wall of the ring 45.

If it is desired to subsequently filter and separate the denser fluid from the fluid mixture for subsequent use, I provide means for removal of the fluid mixture with a minimum of solid impurities therein which may take the form of a plurality of axial tubes 47 closed at one end and communicating with the interior of the annular ring 45. The tubes discharge the mixture fluids through an annular passage 48 defined by an annular projection 49 of the housing end cap 50.

The tubes 47 are spaced from both the inner and outer shells and are provided with a plurality of inlets 51 in the portion thereof which extends into the collecting ring 45. The inlets 51 are formed only on the surface of the tubes which face the outer shell. Thus the inlets will not be plugged by solid impurities contained in the mixture of fluids as it flows into the annular ring 45. Furthermore, the inlets are not located in proximity to the outer shell surface where a thin layer of solid particle impurity sludge or slurry will form. Thus the fluid mixture will not enter the inlets in the axial tubes until the fluid mixture in the collecting ring increases to a level to permit passage into the axial tubes. It will be appreciated that the solid impurities in the collecting chamber and annular ring will have, to a large extent, settled before this fluid level is reached.

It will be understood therefore that the fluid mixture containing a quantity of the desired fluid is substantially free of solid impurities and may now be separated from the undesired fluid.

The housing cover 50 is constructed so as to provide flow passages for the desired fluid which discharges through a plurality of outlets 53 formed in the inner and outer shells at the opposite end of the chamber from the inlet ports.

The housing end cover 50 is provided with an inwardly extending sleeve portion 54 and is threaded as at 55 for engagement with the housing. When assembled, the outturned flange 56 of the housing end cover abuts the end surface of the housing. Seal means are provided to insure a leakproof fitting with the housing.

The housing has an annular passage 58 closed by the sleeve portion of the end cover to provide a fluid flow passage for the mixture of fluids from the axial tubes 47, branch passage 59 and housing formed discharge outlet 60.

Passages 53 communicate with an annular fluid flow passage 61 for discharge of the desired fluid through the chamber 62 defined by the housing wall and the outer shell. Thus the desired fluid will flow in a countercurrent relation to the centrifuging flow in the centrifuge chamber for discharge through an outlet 63 formed in the housing 7.

To illustrate the features of the present invention, a fuel and water mixture containing the following solid particle impurities would have a separation spectrum in the centrifuge chambers in accordance with their relative specific gravities:

| | Sp. gr. |
|---|---|
| Iron oxide | 5.10 |
| Silica sand and test dust | 2.10 |
| Lints-dry | 1.10 |
| Water | 1.00 |
| Lints-fuel wetted | 0.93 |
| Fuel | 0.76 |

It is noted that, while dry particles of lint have a higher specific gravity than water and would be expected to separate before the water, a quantity of the particles of lint would be soaked with fuel and thus have an overall or relative specific gravity less than that of water.

In operation, therefore, the quill shaft drives the impeller rotor at the desired speed, for example 8500 r.p.m. A mixture of fluids of different density and containing solid impurities may be introduced through the passage 22, the annular passage 23 and through the plurality of inlets 14 into the centrifuge chambers.

The solid particles having the highest specific gravities will be centrifuged out first against the inner shell 37 and passed through the louvers 41 formed therein to be deposited against the outer shell 36.

The undesired water and lighter weight fluid containing a small portion of denser fluid and a small percentage of lighter weight solid impurities will be centrifuged into the shell collecting depression 43 and then pass through the longitudinal axial slots 44 into the collecting chamber 38. The fluid mixture will contain a small amount of solid impurities.

Finally, the lighter weight lint will collect at the terminal ends of the centrifuge chambers and will then pass through the louvers 42 into the collecting chamber 38. The substantially impurity free and separated fluid will then flow through the outlet passages 53 into the annular passage 61 and from there through the chamber defined by the housing and the outer shell to the discharge outlet for subsequent use.

The centrifugal forces acting on the impurities in the collecting chamber 38 tend to hold the impurities against the outer shell 36. When the fluid in the collecting chamber has reached a level permitting contact with the axial tubes 47, the fluid mixture in the chamber containing but a small percentage of the desired fluid will then pass through the axial tubes and the annular passages 58 for discharge through the outlets 59 and 60.

By employing longitudinal slots rather than louvers in the central portion of the inner shell and the axial tubes communicating with the annular ring, I provide simple and effective means for separating solid particles from a fluid or fluid mixtures.

If it is desired to clean the collecting chamber, it is only necessary to remove the end cover, the nut from the spider and the drive pins. After removing the end cover, spider nut and drive pins, the inner and outer shells are easily slipped out of their seats against the flanges provided by the rotor bottom plate and may be quickly cleaned without requiring disassembly of the central drive means. Furthermore by positioning the drive pins eccentrically it will be impossible to reassemble the shells in any other than the desired relationship, thus assuring that the original dynamic balance of the device will be maintained.

It will be appreciated that the assembly operates not only as a centrifuging filter and separation device, but also as a pump means and may be employed either as a primary or auxiliary pump.

Although various minor modifications might be suggested by those versed in the art, it should be understood that I wish to embody within the scope of the patent warranted hereon all such embodiments as reasonably and properly come within the scope of my contribution to the art.

I claim as my invention:

1. Apparatus for centrifugally filtering solid particles from a fluid and mixtures of fluids comprising:
    a housing having a fluid inlet and outlet formed therein;
        a vaned rotor centrally located in said housing;
        an apertured end plate carried by said rotor adjacent said fluid inlet;
        an inner shell member removably carried by said rotor cooperating with said end plate and said vanes to define at least two centrifuge chambers therebetween communicating with said housing formed inlet through said apertures in said end plate; means communicating at least one of said centrifuge chambers with said housing formed outlet;
        a plurality of first louvers formed in said inner shell member adjacent said end plate communicating with said chambers for receiving centrifuged solid particles;
        a plurality of second louvers formed in said inner shell member adjacent the other end thereof communicating with said chambers for receiving centrifuged solid particles;
        an annular recessed portion on said inner shell intermediate said first and second plurality of louvers;
        a plurality of axially extending longitudinal slots formed in said annular recessed portion of said inner shell member communicating with said chambers for receiving centrifuged solid particles;
        an outer shell member removably carried by said rotor cooperating with said end plate and said inner shell member to define a chamber for collecting centrifuged solid particles;
        an annular U-shaped member in said chamber, the open side thereof being positioned adjacent the recessed portion of said inner member for receiving solid particles and liquid from said slots;
        and means communicating with said U-shaped member for removing liquid from said U-shaped member.

2. Apparatus for centrifugally filtering solid particles from a fluid and mixture of fluids comprising:
    a housing having a fluid inlet,
    a fluid outlet and a second outlet formed therein;
        a vaned rotor centrally located in said housing;
        an apertured end plate carried by said rotor;
        an inner shell member removably carried by said rotor cooperating with said vanes and said end plate to define at least two centrifuge chambers communicating with said housing formed inlet through said end plate apertures; means communicating at least one of said centrifuge chambers with said housing formed fluid outlet;
        a plurality of first louvers formed in said inner shell member adjacent said end plate and communicating with said chambers for receiving centrifuged solid particles;
        a plurality of second louvers formed adjacent the opposite end of said inner member in communication with said chambers for receiving centrifuged solid particles;
        an annular recessed portion on said inner shell intermediate said first and second louvers;
        a plurality of axially extending longitudinal slots formed in said annular recessed portion of said inner shell member in communication with said chambers for receiving centrifuged solid particles;
        an outer shell member removably carried by said rotor cooperating with said end plate and said inner shell member to define a chamber for collecting centrifuged solid particles;
        an annular U-shaped member centrally located in said collecting chamber,
            the open side thereof being positioned adjacent said recessed portion of the inner shell member for receiving solid particles and liquid from said slots;
        a plurality of axially extending apertured tubes communicating with the chamber defined by said U-shaped member and said second outlet formed in said housing,
        and said axial tubes being positioned in spaced apart relation from said inner shell and outer shell members with the apertures facing said outer shell member.

3. Apparatus for centrifugally filtering solid particles from a fluid and mixtures of fluids comprising:
    a housing having a fluid inlet and outlet formed therein;
        a rotor centrally located in said housing,
        said rotor outwardly tapering from the fluid inlet to the fluid outlet, a plurality of impellers mounted on said rotor;
an apertured inlet end plate carried by said rotor;
an apertured inner shell member removably carried by said rotor cooperating with said vanes and said end plate to define at least two centrifuge chambers,
said centrifuge chambers communicating with said housing formed inlet through the apertures formed in said end plate, means communicating at least one of said centrifuge chambers with said housing formed outlet;
a plurality of first louvers formed in said inner shell member adjacent said end plate communicating with said chambers for receiving the majority of heavier weight centrifuge solid particles;
a plurality of second louvers formed in said inner shell member adjacent the other end thereof communicating with said chambers for receiving the majority of lightest weight centrifuged solid particles;
an annular recessed portion on said inner shell member intermediate said first and second plurality of louvers;
a plurality of axially extending longitudinal slots formed in said annular recessed portion of said inner shell member communicating with said chambers for receiving centrifuged solid particles and the heavier fluid;
an outer shell member removably carried by said rotor cooperating with said end plate and said inner shell to define a chamber for collecting centrifuged solid particles;
an annular U-shaped member centrally located in said collecting chamber,
the open side thereof being positioned adjacent the recess portion of said inner shell member for receiving solid particles and liquid from said slots in the inner shell member located adjacent thereto;
means communicating with said U-shaped member for removing liquid from said U-shaped member; and a removable end cover on said housing positioned opposite said housing inlet,
said end cover forming said housing outlet for the desired fluid,
said inner and outer shell members being removable from the housing through the cover side of said housing
whereby the inner and outer shell members may be removed from the housing while the rotor and impellers remain assembled.

4. Apparatus for centrifugally filtering solid particles from a fluid and mixtures of fluids comprising:
a housing having a fluid inlet and outlet formed therein;
a removable end cover on said housing positioned opposite said inlet and forming said housing outlet;
a vaned rotor centrally located in said housing;
an apertured inlet end plate carried by said rotor;
an inner shell member removably carried by said rotor cooperating with said end plate and said vanes to define at least two centrifuge chambers communicating with said housing formed inlet through said end plate apertures; means communicating at least one of said centrifuge chambers with said housing formed outlet;
means providing removal of said inner shell member from said housing through the end cover side of the housing while maintaining the vane rotor assembled;
a plurality of first louvers formed in said inner shell member adjacent said end plate in communication with said chambers for receiving centrifuged solid particles;
a plurality of second louvers formed in said inner shell member adjacent the opposite end of said inner shell member in communication with said chambers for receiving centrifuged solid particles;
an annular recessed portion on said inner shell member intermediate said first and second louvers, a plurality of axially extending longitudinal slots formed in said annular recessed portion of said inner shell member in communication with said chambers for receiving solid particles;
an outer shell member removably carried by said rotor cooperating with said end plate and said inner shell member to define a chamber for collecting centrifuged solid particles;
an annular U-shaped member centrally located in said chamber,
the open side thereof being positioned adjacent the recessed portion of said inner member for receiving solid particles from said slots;
a second outlet formed in said housing, and a plurality of axially extending tubes communicating with said U-shaped member for removing fluid from said collecting chamber through said second outlet formed in said housing.

References Cited in the file of this patent

UNITED STATES PATENTS

| | | |
|---|---|---|
| 600,684 | Daseking | Mar. 15, 1898 |
| 1,619,652 | Carter | Mar. 1, 1927 |
| 2,540,474 | Cox | Feb. 6, 1951 |
| 2,587,206 | Pattinson | Feb. 26, 1952 |
| 2,860,776 | Hays | Nov. 18, 1958 |
| 2,900,129 | Dega | Aug. 18, 1959 |
| 3,007,629 | Boyland | Nov. 7, 1961 |
| 3,022,937 | Dega | Feb. 27, 1962 |

FOREIGN PATENTS

| | | |
|---|---|---|
| 13,464 | Great Britain | Apr. 15, 1899 |